(12) United States Patent
Fukasawa et al.

(10) Patent No.: US 8,943,161 B2
(45) Date of Patent: Jan. 27, 2015

(54) TIME SYNCHRONIZATION SYSTEM

(71) Applicant: Yokogawa Electric Corporation, Musashino-shi, Tokyo (JP)

(72) Inventors: Masayuki Fukasawa, Musashino (JP); Takashi Aoe, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 240 days.

(21) Appl. No.: 13/738,285

(22) Filed: Jan. 10, 2013

(65) Prior Publication Data

US 2013/0185374 A1 Jul. 18, 2013

(30) Foreign Application Priority Data

Jan. 12, 2012 (JP) ................................. 2012-004236

(51) Int. Cl.
*G06F 15/16* (2006.01)
*H04L 29/08* (2006.01)
*H04J 3/06* (2006.01)
*H04L 29/06* (2006.01)

(52) U.S. Cl.
CPC .............. *H04L 67/00* (2013.01); *H04J 3/0673* (2013.01); *H04L 69/28* (2013.01); *H04J 3/0667* (2013.01)
USPC ...................................................... 709/208

(58) Field of Classification Search
CPC . H04W 56/00; H04W 52/0216; H04W 24/00; H04J 3/065; H04J 3/0658; H04J 3/0673; H04L 5/0007; H04L 27/2662; H04N 13/0048; H04N 21/242
USPC .................. 709/208; 370/336, 311; 375/340, 375/240.28
See application file for complete search history.

(56) References Cited

U.S. PATENT DOCUMENTS

| 8,515,069 | B2 * | 8/2013 | Kuo et al. ...................... 380/260 |
| 2006/0013208 | A1 * | 1/2006 | Rietschel et al. ............. 370/389 |
| 2012/0320794 | A1 * | 12/2012 | Belhadj et al. ................ 370/254 |
| 2013/0080817 | A1 * | 3/2013 | Mihelic ......................... 713/401 |
| 2013/0128903 | A1 * | 5/2013 | Kristoffersen et al. ....... 370/503 |
| 2013/0229983 | A1 * | 9/2013 | Dick et al. .................... 370/328 |
| 2013/0272322 | A1 * | 10/2013 | Sagarwala et al. ............ 370/508 |

FOREIGN PATENT DOCUMENTS

JP 2010-004321 A 1/2010

* cited by examiner

*Primary Examiner* — Umar Cheema
*Assistant Examiner* — Rachel J Hackenberg
(74) *Attorney, Agent, or Firm* — Sughrue Mion, PLLC (57) ABSTRACT

A time synchronization system includes: a master including: a main processor to which a first IP address is assigned; and a time synchronization processor to which a second IP address is assigned; a plurality of slaves configured to send a first packet whose destination is the first IP address and a second packet whose destination is the second IP address to the master; and a relay configured to send the first packet to the main processor and to send the second packet to the time synchronization processor. The main processor receives the first packet from the relay and performs a certain process on the first packet. The time synchronization processor receives the second packet from the relay and performs a time synchronization process between the master and said one of the slaves based on the second packet.

8 Claims, 8 Drawing Sheets

TIME SYNCHRONIZATION SYSTEM

This application claims priority from Japanese Patent Applications No. 2012-004236, filed on Jan. 12, 2012, the entire contents of which are herein incorporated by reference.

BACKGROUND

1. Technical Field

Embodiments described herein relate to a time synchronization system for communication between a master and plural slaves.

2. Related Art

Systems are known in which a master and plural slaves are connected by a network and data communications are performed between them over the network. Each of the master and the slaves incorporates an internal clock therein, and it is important to establish synchronization between the master and each slave. The IEEE 1588 protocol (hereinafter referred to as "1588 protocol") is known as a protocol for such time synchronization.

In the 1588 protocol, the internal clocks of the master and each slave are synchronized with each other by exchanging packets which contain time stamp information generated based on the internal clock of each apparatus and calculating a network delay and a time difference. JP-A-2010-4321 discloses time synchronization systems utilizing the 1588 protocol.

In the 1588 protocol, in general, each slave sends, to the master, packets containing a transmission time that is calculated based on its own internal clock. The master determines a reception time based on its own internal clock. The difference between the transmission time and the reception time is equal to the sum of a time difference between the two internal clocks and a network delay. The same applies to a case that the master sends time synchronization packets to each slave. In this manner, the internal clocks of the master and each slave are synchronized with each other by calculating a time difference between the two internal clocks and a network delay.

Figure 5:
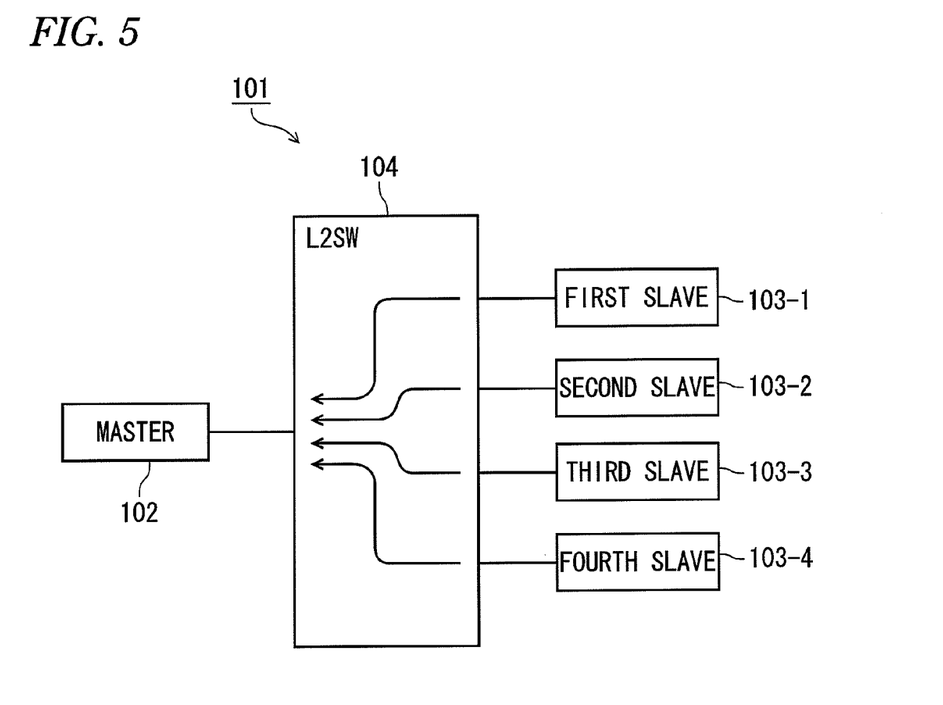
FIG. 5 outlines a related-art time synchronization system.

FIG. 5 shows a related-art time synchronization system 101. The time synchronization system 101 includes a master 102, four slaves (a first slave 103-1 to a fourth slave 103-4 (generically referred to as a slave(s) 103), and a relay 104. Packet communications for purposes other than time synchronization are mainly performed between the master 102 and each slave 103, though packet communications for time synchronization are also performed.

The relay 104 is a network relay for relaying communications between the master 102 and each slave 103 and is what is called a layer 2 switch (denoted by L2SW in FIG. 5) may be used as the relay 104. The relay 104 determines communication destinations based on IP addresses that are set in packets, and thereby realizes packet communications between the master 102 and the slaves 103.

Figure 6:
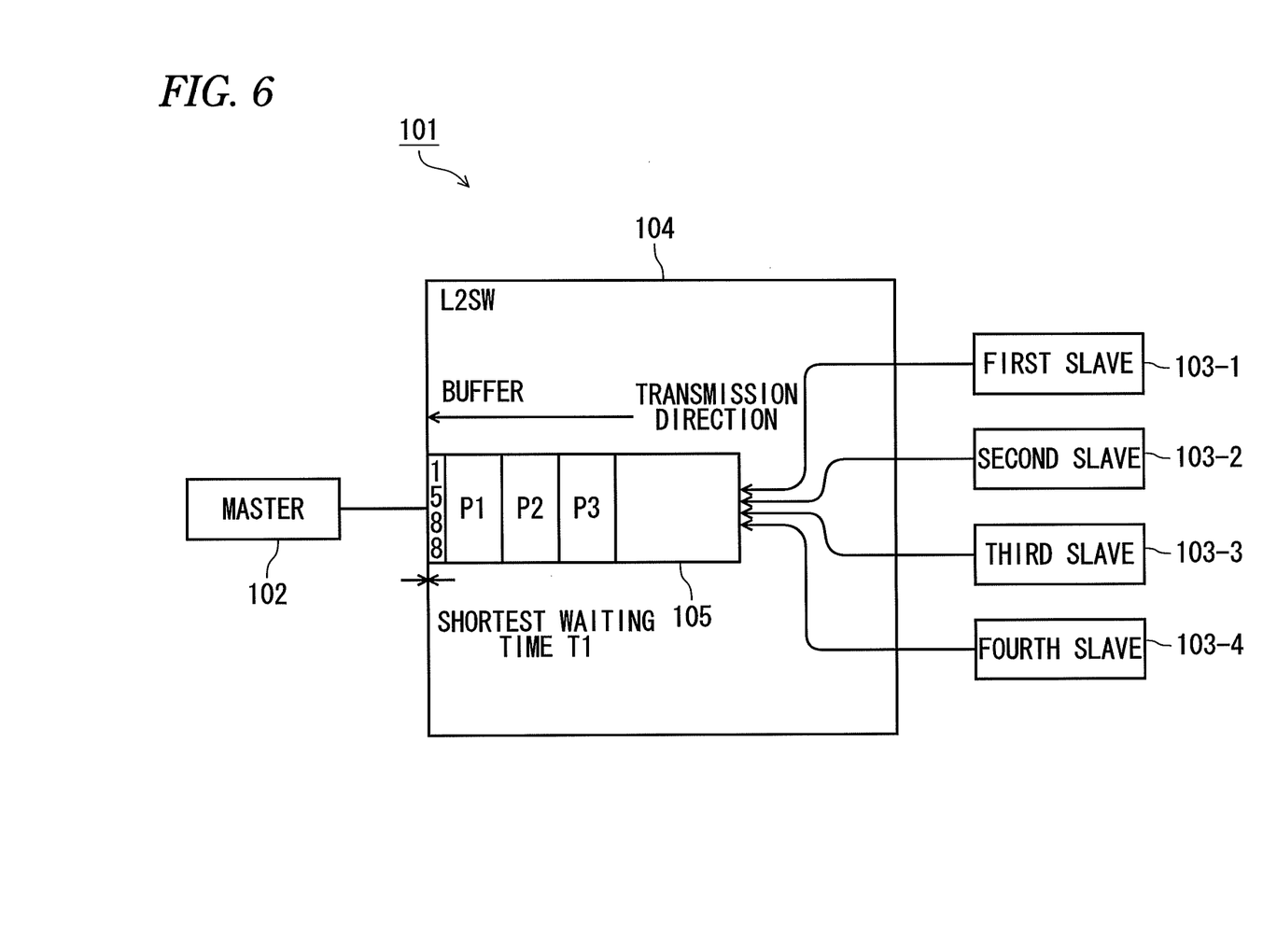
FIG. 6 shows a first communication example in the related-art conventional time synchronization system.

When packets are communicated from plural slaves 103 to the master 102, the relay 104 is loaded heavily because of concentration of packets. As shown in FIG. 6, the layer 2 switch serving as the relay 104 has buffers 105 for respective IP addresses and sends out packets to the master 102 in order of their inputs to the buffers 105.

FIG. 6 shows a state (first communication example) that ordinary packets (not for time synchronization) P1, P2, and P3 and a packet 1588 (for time synchronization) are being transmitted from the four slaves 103 to the master 102 via the relay 104. The ordinary packets P1-P3 and the time synchronization packet 1588 contain an IP address of the master 102 as a destination IP address.

In the example of FIG. 6, the time synchronization packet 1588 is given highest priority and hence is output first from the buffers 105 toward the master 102. Therefore, the time synchronization packet 1588 can be output with a shortest waiting time T1 without being affected by the other packets P1-P3.

Figure 7:
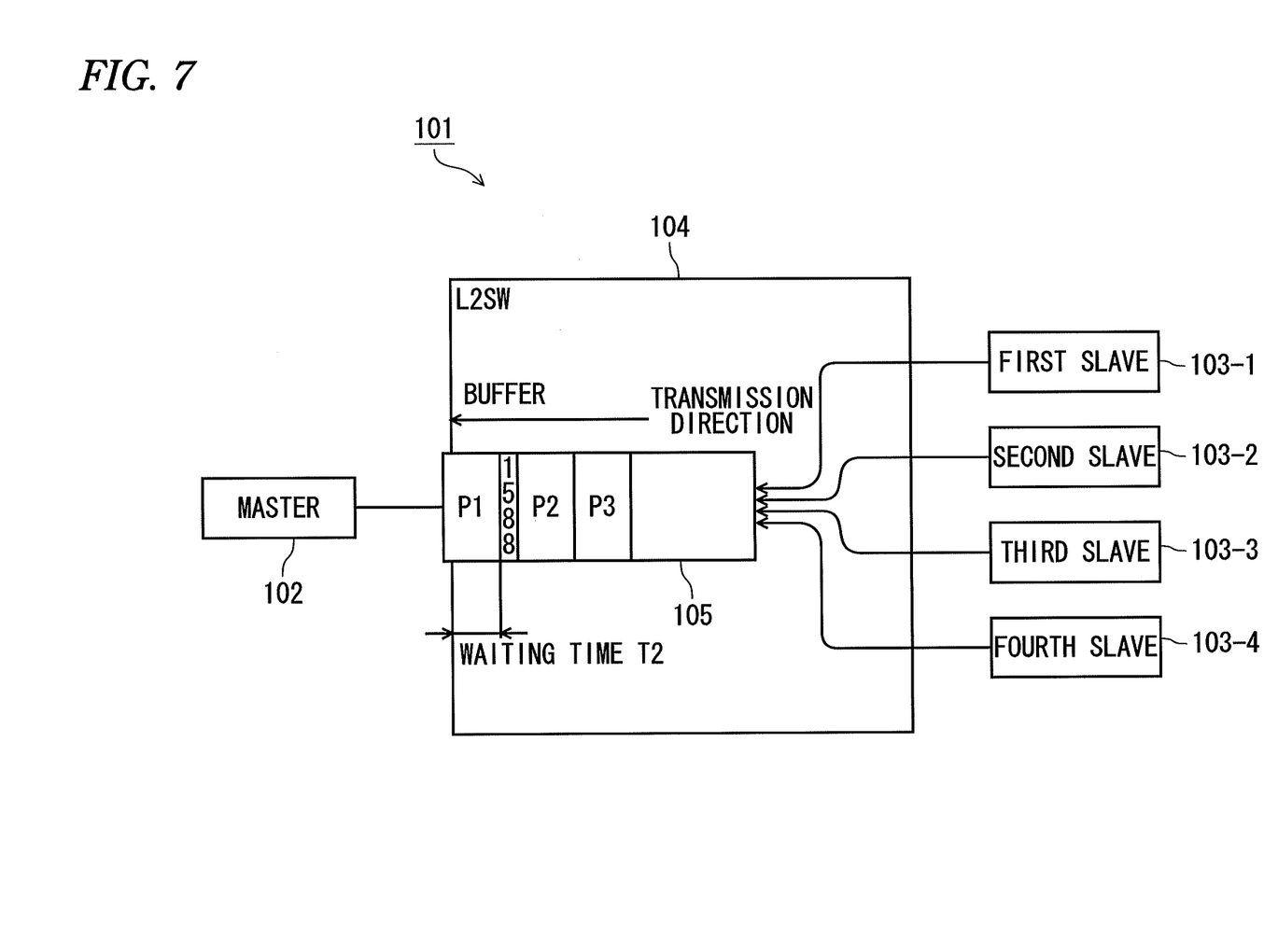
FIG. 7 shows a second communication example in the related-art time synchronization system.

FIG. 7 shows a second communication example. In this example, although time synchronization packet 1588 is given highest priority, an ordinary packet P1 reached the buffers 105 before the time synchronization packet 1588 and is already being output from the buffers 105. Since the output of the ordinary packet P1 cannot be suspended halfway, the time synchronization packet 1588 should wait until completion of the output of the ordinary packet P1. The time synchronization packet 1588 is output after a lapse of a waiting time T2.

Figure 8:
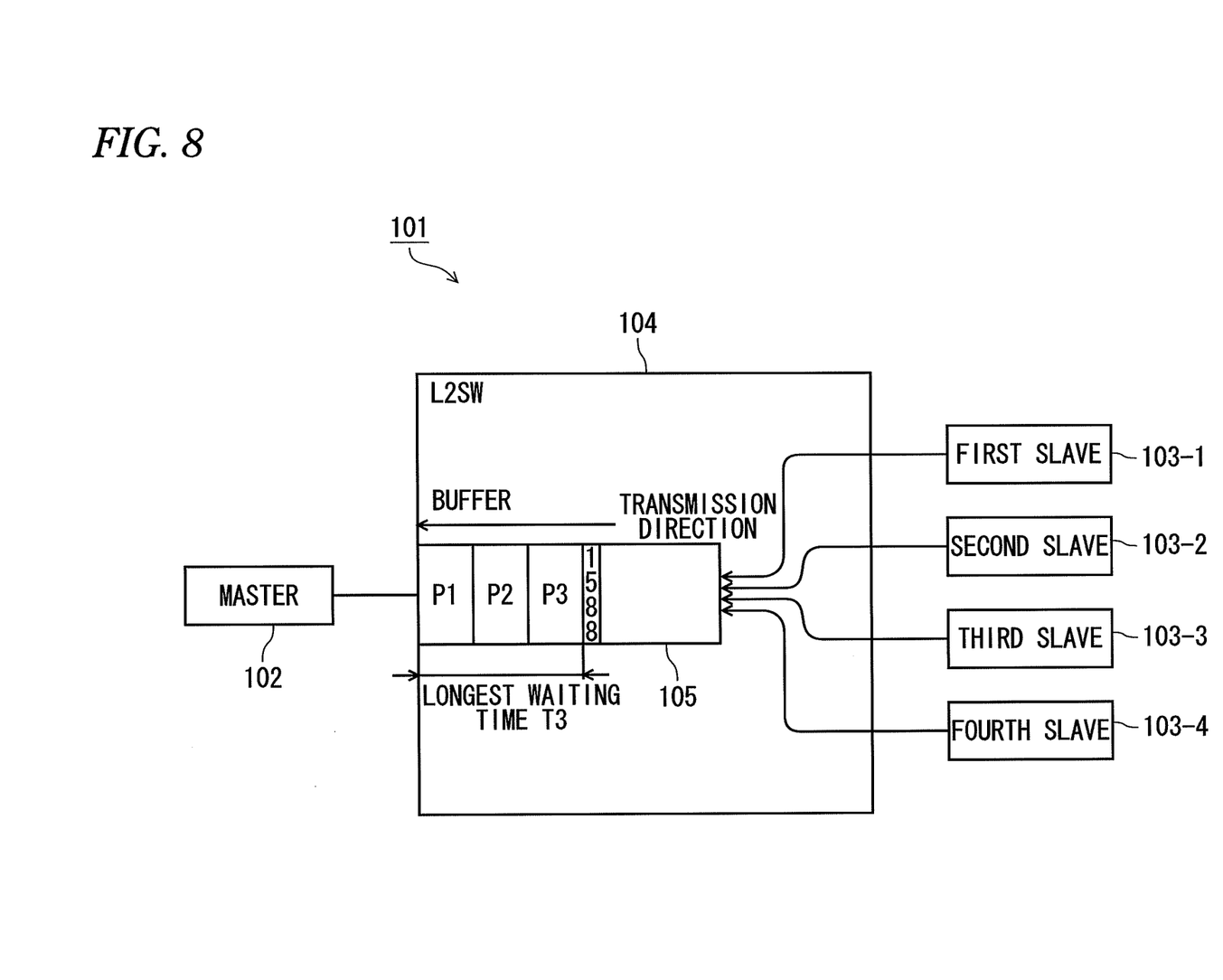
FIG. 8 shows a third communication example in the related-art time synchronization system.

FIG. 8 shows a third communication example. In this example, ordinary packets P1-P3 are higher in priority than a time synchronization packet 1588. The time synchronization packet 1588 is sent to the master 102 after completion of sending of the ordinary packets P1-P3. In this example, the time synchronization packet 1588 is sent to the master 102 after a lapse of a longest waiting time T3.

A time synchronization packet is a packet for establishing time synchronization between the master 102 and each slave 103, and time synchronization cannot be established accurately if the timing of arrival of a time synchronization packet varies. That is, the accuracy of time synchronization deteriorates if the network delay from sending of a time synchronization packet by a slave 103 to its reception by the master 102 varies.

In the example of FIG. 6 in which the time synchronization packet 1588 is output first, and thus is not affected by the other ordinary packets P1-P3. Hence, the network delay can be made equal to the shortest waiting time T1. Since the waiting time T1 is not affected by the other ordinary packets P1-P3, the master 102 can establish time synchronization accurately based on the received time synchronization packet 1588.

On the other hand, in the example of FIG. 7 in which output of the ordinary packet P1 has already started though the time synchronization packet 1588 is given highest priority. Output of the time synchronization packet 1588 is started after completion of the output of the ordinary packet P1. In this example, the waiting time T2 varies depending on to what extent the output of the ordinary packet P1 has progressed at the time of arrival of the time synchronization packet 1588 at the relay 104.

For example, where the communication rate is 100 Mbps and the packet length of the ordinary packet P1 is 1 Kbytes, the waiting time T2 measures a maximum of 80 us. The waiting time T2 varies up to 80 us depending on the size of the ordinary packet P1 and to what extent its output has progressed. Thus, the waiting time T2 cannot be predicted.

In the example of FIG. 8 in which the ordinary packets P1-P3 are higher in priority than the time synchronization packet 1588, the time synchronization packet 1588 is output after completion of output of the ordinary packets P1-P3. The packet lengths of the ordinary packets P1-P3 are variable, and it cannot be predicted to what extent the output of the ordinary packets P1-P3 has progressed. Therefore, the waiting time T3 varies to a large extent.

As mentioned above, the master 102 and each slave 103 establish time synchronization based on a time synchronization packet. Therefore, if the waiting time varies as in the examples of FIGS. 7 and 8, the network delay varies and the accuracy of time synchronization deteriorates. In particular, packets are communicated from many slaves 103 to the master 102, the network delay varies to a large extent because of the concentration of packets.

SUMMARY OF THE INVENTION

One or more illustrative aspects of the present invention are to increase the accuracy of time synchronization by reducing the variation of the network delay even at the occurrence of packet concentration.

According to one or more aspects of the present invention, there is provided a time synchronization system. The time synchronization system comprises: a master comprising: a main processor to which a first IP address is assigned; and a time synchronization processor to which a second IP address is assigned, wherein the first IP address is different from the second IP address; a plurality of slaves configured to send a first packet whose destination is the first IP address and a second packet whose destination is the second IP address to the master, wherein the second packet is a packet for time synchronization between the master and one of the slaves, and the first packet is a data packet different from the second packet; and a relay provided between the slaves and the master to relay the first packet and the second packet sent from the slaves to the master, the relay being configured to send the first packet to the main processor and to send the second packet to the time synchronization processor. The main processor is configured to receive the first packet from the relay and perform a certain process on the first packet. The time synchronization processor is configured to receive the second packet from the relay and perform a time synchronization process between the master and said one of the slaves based on the second packet.

According to one or more aspects of the present invention, the system further comprises a plurality of field devices each configured to measure or control a physical quantity of an object and communicating with the slaves to send a measurement data or control data of the physical quantity of the object to the slaves, wherein the first packet is the measurement data or control data of the physical quantity of the object.

According to one or more aspects of the present invention, the field devices are configured to communicate with the slaves through a wireless communication.

According to one or more aspects of the present invention, the field devices are configured to communicate with the slaves through the wireless communication using a time division multiplex communication.

According to one or more aspects of the present invention, the field devices are configured to dynamically select a slave having a high communication quality from the plurality of slaves and communicate with the selected slave.

According to one or more aspects of the present invention, each of the slaves has an internal clock. After the internal clocks of the slaves are synchronized with each other, the field devices communicate with the slaves through the wireless communication using a time division multiplex communication.

According to one or more aspects of the present invention, the plurality of slaves are configured to measure or control a physical quantity of an object, wherein the first packet is a measurement data or control data of the physical quantity of the object.

According to one or more aspects of the present invention, the time synchronization processor is removable from the master.

According to the present invention, the variation of the network delay is reduced and a time synchronization packet can be communicated without being affected by a variation of the network delay. Therefore, accurate time synchronization can be realized between the master and each slave.

Other aspects and advantages of the present invention will be apparent from the following description, the drawings and the claims.

DETAILED DESCRIPTION OF EXEMPLARY EMBODIMENTS

An embodiment of the present invention will be hereinafter described with reference to the drawings. The following description will be made with assumptions that each slave is an apparatus which communicates with a physical quantity measurement and control device which measures a physical quantity, and the master is an apparatus which processes measurement data and controls the physical quantity measurement and control device by communicating with the slave. In this embodiment, the master and the slave are not limited to these kinds of apparatus. For example, the invention can also be applied to a system which is used in a substation and employs a time server, a system in which plural video cameras are connected using the IEEE 1588 protocol, and a time synchronization system in a home AV (Audio Video) LAN (Local Area Network).

For example, physical quantity measurement and control devices are field devices such as a pressure meter, a thermometer, a flow meter, etc. which measure a physical quantity such as pressure, temperature, or a flow rate and actuators such as a compressor, a heater, and a valve which control a physical quantity such as pressure, temperature, or a flow rate to a target value.

Each physical quantity measurement and control device (hereinafter called a field device) is configured to communicate with the slave by wire or wirelessly and sends a measured physical quantity value to a slave as measurement data. Each slave sends received measurement data to the master which is located at a distant place. The master is configured to communicate with one or plural slaves over a network by wire or wirelessly. The master performs prescribed processing on measurement data received from each slave.

The master sends control data for controlling the field devices to the slaves over the network. The control data are received by the slaves, and the slaves control the field devices by sending control data to them.

The master and each slave incorporate an internal clock therein, and it is important to establish time synchronization between the master and each slave. For example, a field device performs a measurement with prescribed timing and sends measurement data to a slave. The slave sends the received measurement data to the master, and the master makes a comparison using the received measurement data and determines whether or not the physical quantity value is normal. In this operation, it is very important that time synchronization be established between the master and the slave.

In particular, since the slaves frequently send measurement data to the master, high packet concentration tends to occur. On the other hand, time synchronization packets are communicated in a constant cycle. As a result, time synchronization packets may be affected by high concentration of packets of measurement data, resulting in deterioration in the accuracy of time synchronization. If the accuracy of time synchronization of the slaves is deteriorated, each field device cannot measure a measurement subject with the same timing, resulting in a serious reduction in measurement accuracy.

Figure 1:
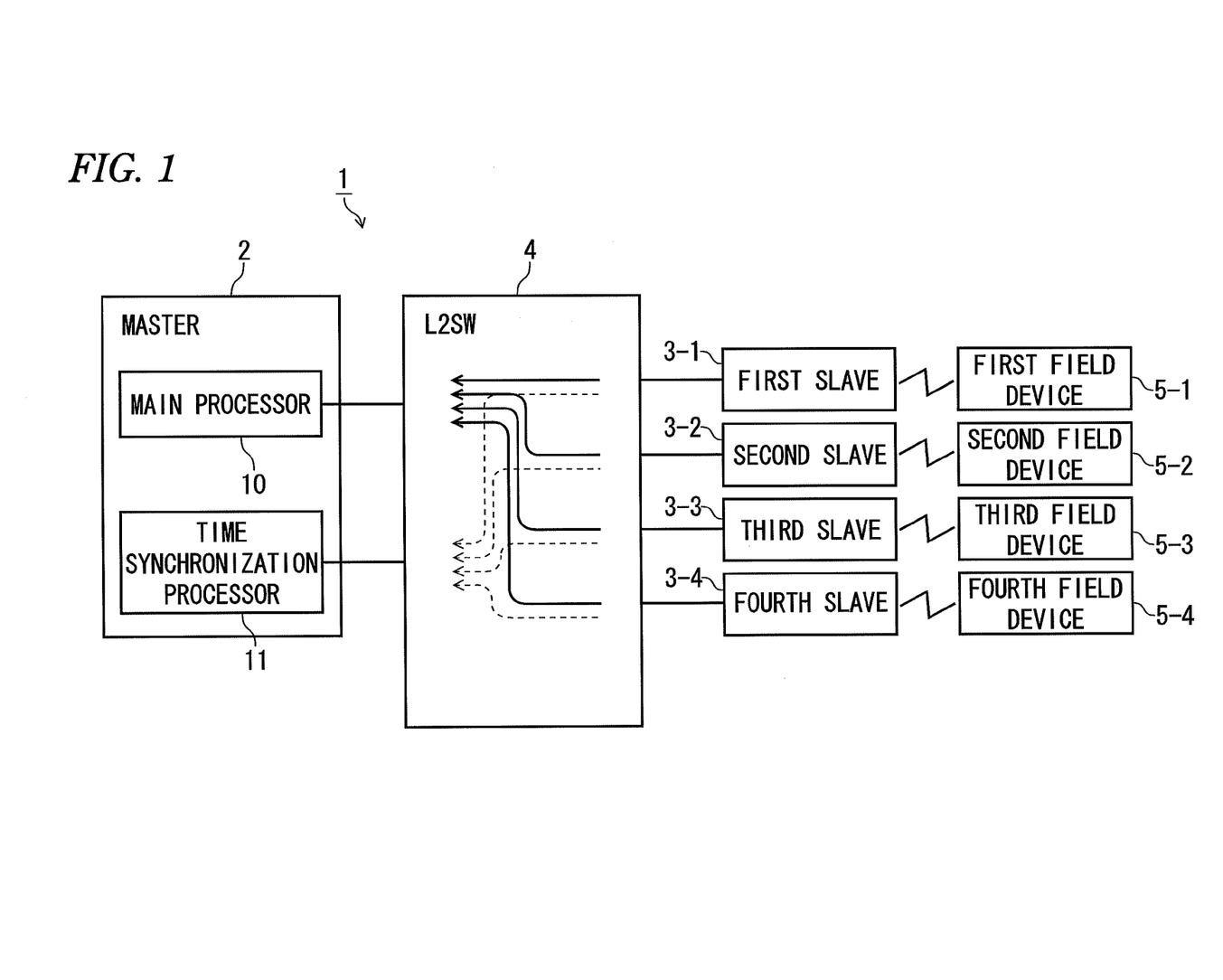
FIG. 1 outlines a time synchronization system according to an embodiment.

FIG. 1 shows a time synchronization system 1 according to the embodiment, which has a master 2 and four slaves (a first slave 3-1 to a fourth slave 3-4 (generically referred to as a slave(s) 3)), a relay 4, and four field devices (a first field device 5-1 to a fourth field device 5-2 (generically referred to as a field device(s) 5).

The number of slaves 3 is not limited to four and may be any arbitrary plural number. Likewise, the number of field devices 5 is not limited to four and may be any arbitrary plural number. Although in FIG. 1 each slave 3 communicates with one field device 5, a slave(s) may exist which communicates with plural field devices 5.

Each slave 3 and the corresponding field device 5 may communicate with each other either by wire or wirelessly. In this example, it is assumed that each slave 3 and the corresponding field device 5 communicate with each other wirelessly. The master 2 and each slave 3 may communicate with each other either by wire or wirelessly. In this example, it is assumed that the master 2 and each slave 3 communicate with each other by wire. Therefore, the master 2 and the relay 4 are connected to each other by wire and the relay 4 and each slave 3 are connected to each other by wire.

The master 2 is a host apparatus. Each slave 3 communicates with the corresponding field device 5. Thus, each slave 3 receives measurement data measured by the corresponding field device 5 and sends the received measurement data to the master by a packet communication. Control data is sent from the master 2 to each slave 3 by a packet communication, which communicates the received control data to the corresponding field device 5. In this manner, the master 2 controls the individual field devices 5. The master 2 and the individual slaves 3 are connected by a network and the relay 4 is provided in the network. In this example, the relay 4 is a layer 2 switch (denoted by L2SW in FIG. 1).

The master 2 has a main processor 10 and a time synchronization processor 11. The main processor 10 is configured to perform processing other than time synchronization; it mainly processes measurement data. Therefore, the main processor 10 employs a CPU having a high processing ability. The time synchronization processor 11 is a processor that is dedicated to time synchronization, and may employ either a CPU or a circuit for performing time synchronization processing. Where the time synchronization processor 11 may employ a CPU having a low processing ability because it is required to perform only time synchronization processing.

In ordinary masters, the two functions of the main processor and the time synchronization processor are implemented by using one CPU and one network port. That is, ordinary masters employ a CPU having the two functions of the main processor and the time synchronization processor, and perform both of measurement data processing and time synchronization processing. On the other hand, in the embodiment, the master 2 separately employs the CPU provided in the main processor 10 and the CPU (or processing circuit) provided in the time synchronization processor 11. Alternatively, the master 2 may employ a device in which a single CPU has plural network ports.

The main processor 10 and the time synchronization processor 11 are assigned different IP addresses. By virtue of this measure, in a packet communication from a slave 3, discrimination can be made between a packet (ordinary packet) to be supplied to the main processor 10 and a packet (time synchronization packet) to be supplied to the time synchronization processor 11. Thus, a packet can be supplied to the main processor 10 or the time synchronization processor 11 that corresponds to the destination IP address contained in the packet.

Figure 2:
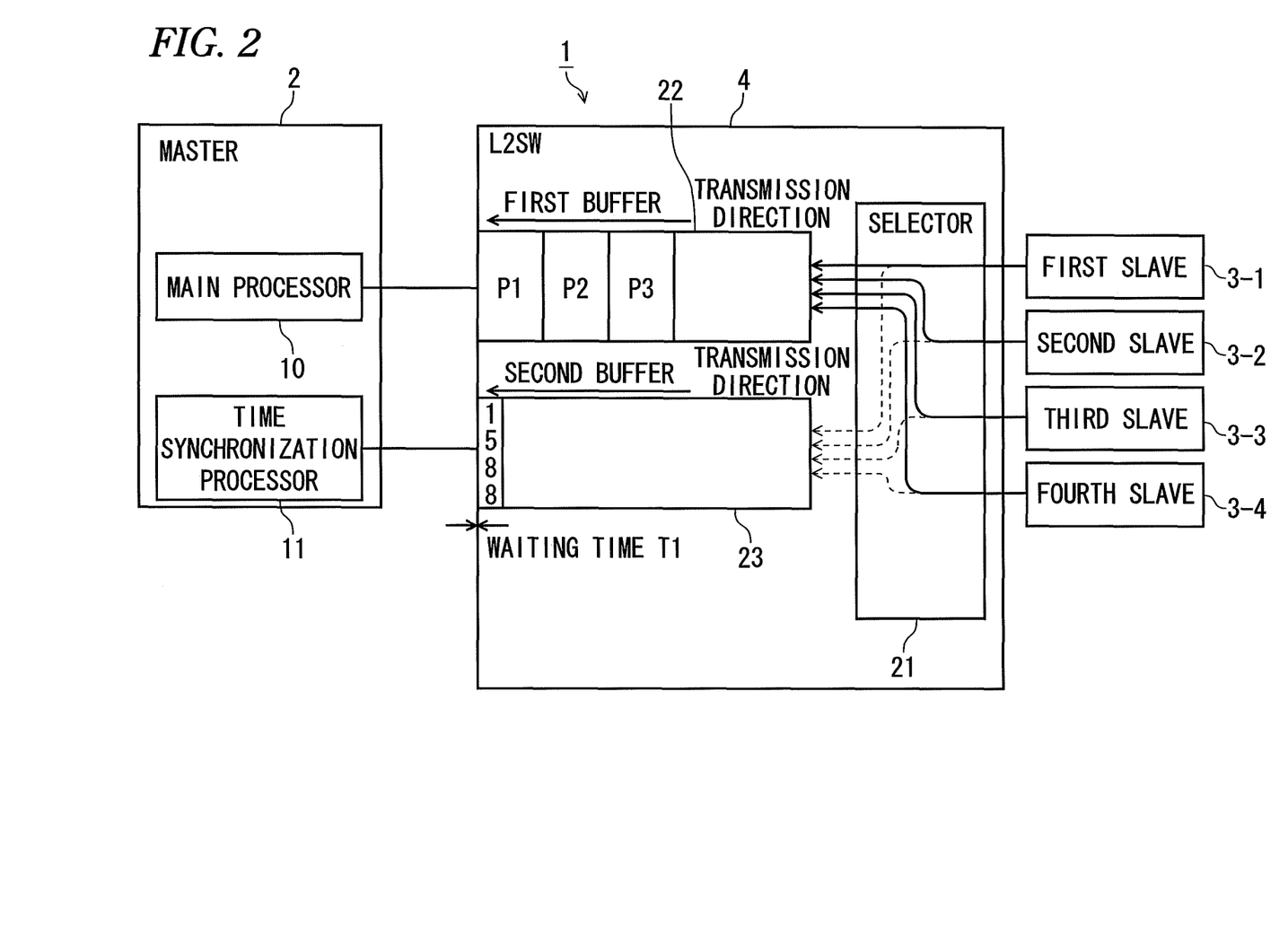
FIG. 2 shows a first communication example in the time synchronization system according to the embodiment.

FIG. 2 shows the details of the relay 4. Although the field devices 5 are not shown in FIGS. 2-4 for the sake of convenience, also in the examples of FIGS. 2 to 4 each slave 3 performs wireless communications with the corresponding field device 5. As shown in FIG. 2, the relay 4 includes a selector 21, a first buffer 22, and a second buffer 23. The selector 21 is configured to distribute packets transmitted from the slaves 3 to destinations that are indicated by respective destination IP addresses contained therein. In FIG. 2, solid-line arrows coming out of the selector 21 indicate that packets are supplied to the first buffer 22 and broken-line arrows indicate that packets are supplied to the second buffer 23.

The first buffer 22 and the second buffer 23 are transmission buffers provided for the respective IP addresses. That is, the first buffer 22 is a buffer corresponding to the IP address of the main processor 10 and the second buffer 23 is a buffer corresponding to the IP address of the time synchronization processor 11. Naturally, the number of IP addresses is not limited to two and may be three or more. Also in the latter case, the selector 21 distributes packets to destinations that are indicated by respective destination IP addresses contained therein. The term "number of IP addresses" as used herein means a logical number; physically, the functions of plural buffers can be realized by dividing the storage area of a single memory.

Therefore, the relay 4 is not limited to a layer 2 switch and may be an arbitrary kind of relay as long as it has the selector 21, the first buffer 22, and the second buffer 23.

Next, a description will be made of how the time synchronization system 1 operates. FIG. 2 shows a first communication example. Measurement data are communicated wirelessly from the first field device 5-1 to the fourth field device 5-4 to the first slave 3-1 to the fourth slave 3-4. It is assumed that the first slave 3-1 to the fourth slave 3-4 output packets almost simultaneously. It is also assumed that the first slave 3-1 to the third slave 3-3 output respective ordinary packets P1-P3 and the fourth slave 3-4 outputs a time synchronization packet 1588. This causes high packet concentration in the relay 4.

Since the first slave 3-1 to the third slave 3-3 output the respective ordinary packets P1-P3, the destination IP addresses contained therein are the IP address of the main processor 10. Therefore, the selector 21 stores the ordinary packets P1-P3 in the first buffer 22 in order. The packet P1 which is stored at the head of the first buffer 22 is first sent to the main processor 10.

On the other hand, since the fourth slave 3-4 outputs the time synchronization packet, the destination IP address contained therein is the IP address of the time synchronization processor 11. Therefore, the selector 21 stores the time synchronization packet 1588 in the second buffer 23. The time synchronization packet 1588 which is stored in the second buffer 23 is sent to the time synchronization processor 11 with a shortest waiting time T1.

The time synchronization packet 1588 which is stored in the second buffer 23 is not affected by the other, ordinary packets P1-P3, because the main processor 10 and the time synchronization processor 11 are assigned different IP addresses and the selector 21 distributes the packets to destinations that are indicated by respective IP addresses contained therein.

Figure 3:
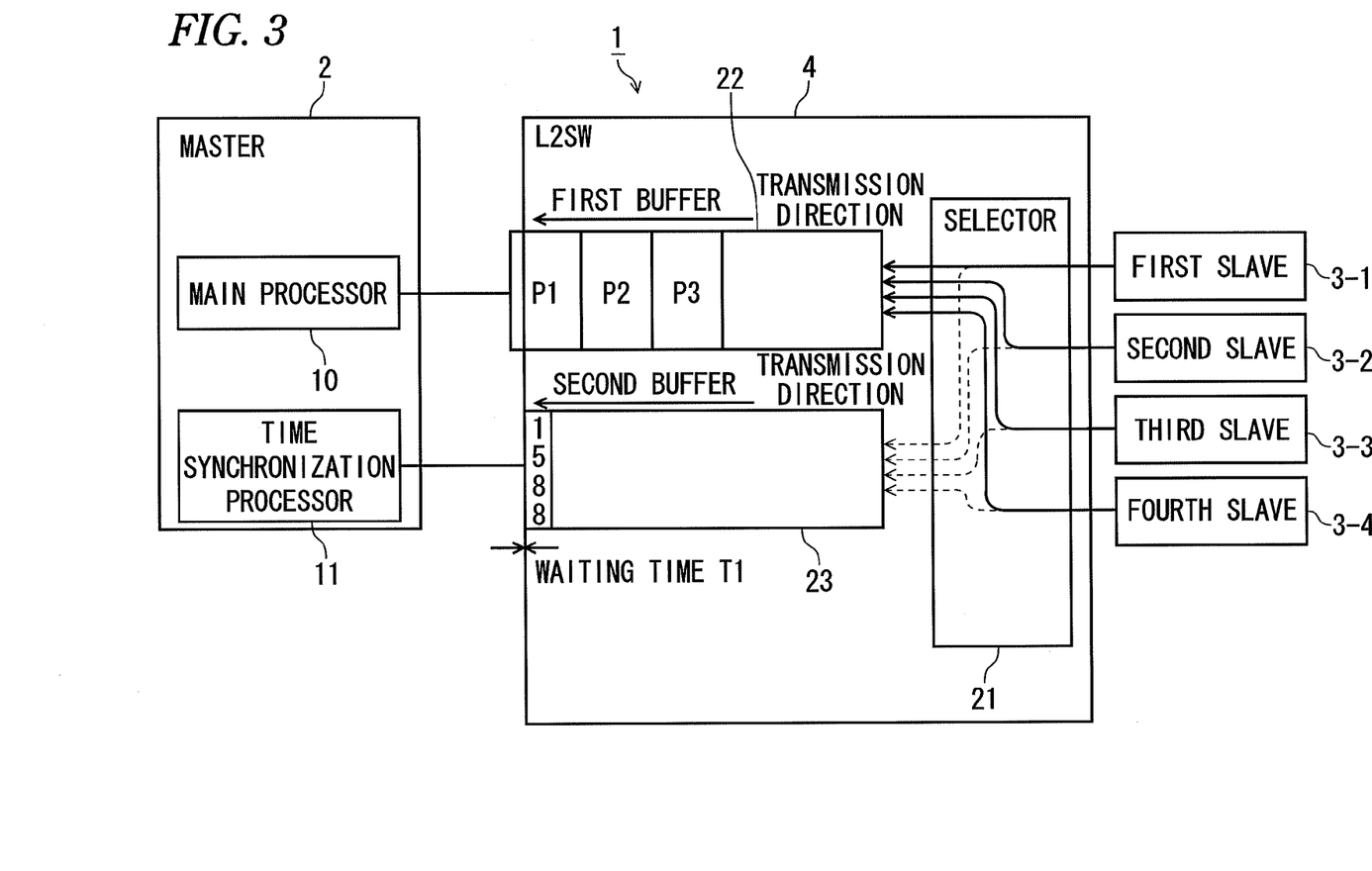
FIG. 3 shows a second communication example in the time synchronization system according to the embodiment.

FIG. 3 shows a second communication example, and shows a state that ordinary packets P1-P3 transmitted from the first slave 3-1 to the third slave 3-3 are stored in the first buffer 22 according to destination IP addresses (the IP address of the main processor 10) contained therein. The head packet P1 is being output from the first buffer 22.

On the other hand, since a time synchronization packet 1588 transmitted from the fourth slave 3-4 has, as a destination IP address, the IP address of the time synchronization processor 11, it is sent to the time synchronization processor 11 from the second buffer 23. The time synchronization packet 1588 is not affected by the other, ordinary packets P1-P3.

That is, even if output of the ordinary packet P1 has already started, the time synchronization packet 1588 can be sent to the time synchronization processor 11 without waiting for completion of the output of the ordinary packet P1. As a result, the time synchronization packet 1588 can be sent to the time synchronization processor 11 with the shortest waiting time T1.

Figure 4:
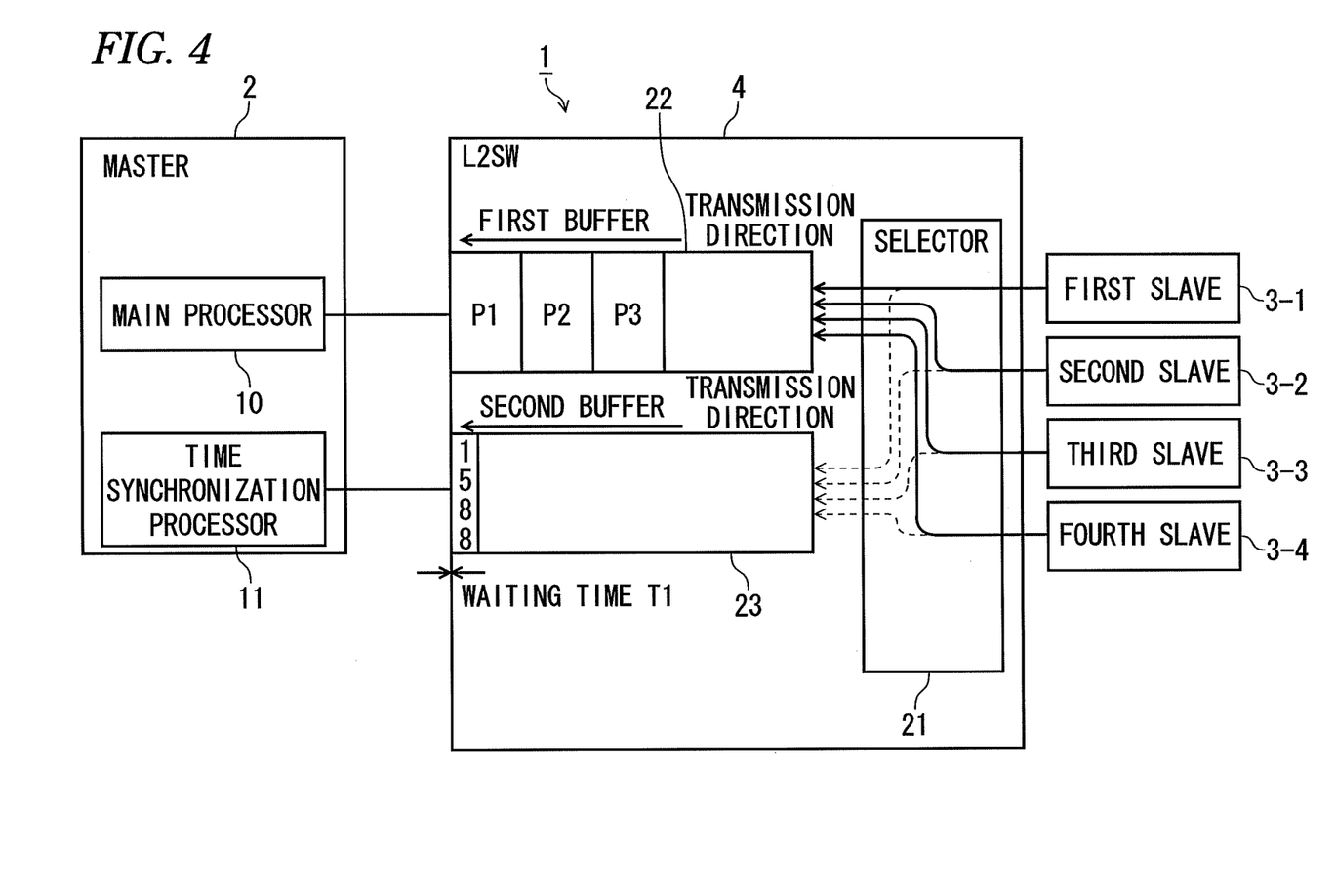
FIG. 4 shows a third communication example in the time synchronization system according to the embodiment.

FIG. 4 shows a third communication example, and shows a state that ordinary packets P1-P3 transmitted from the first slave 3-1 to the third slave 3-3 are stored in the first buffer 22 according to destination IP addresses (the IP address of the main processor 10) contained therein. It is assumed that the ordinary packets P1-P3 are higher in priority than time synchronization packets. Therefore, if a time synchronization packet were stored in the first buffer 22, it would be stored in the last place.

However, as shown in FIG. 4, since the fourth slave 3-4 designated the IP address of the time synchronization processor 11 as the destination address of a time synchronization packet 1588, the time synchronization packet 1588 is stored in the second buffer 23. Therefore, the time synchronization packet 1588 can be sent to the time synchronization processor 11 with the shortest waiting time T1 (FIG. 4 ends up being identical to FIG. 2).

In each of the examples of FIGS. 2-4, the time synchronization packet 1588 that has been transmitted from the fourth slave 3-4 can be sent to the time synchronization processor 11 with the shortest waiting time T1. That is, the time synchronization packet 1588 can always be sent to the time synchronization processor 11 with the same (fixed), shortest waiting time T1 without being affected by the other, ordinary packets P1-P3.

As described above, the time (network delay) from output of a time synchronization packet from a slave 3 to its input to the master 2 is always kept at a fixed value and does not vary. This increases the accuracy of time synchronization. Furthermore, synchronization packets are transmitted in a constant cycle from the slaves 3 to the master 2, they are less prone to be delayed. Thus, time synchronization between the master 2 and each slave 3 can be performed with the shortest waiting time.

As described above, the variation of the network delay can be suppressed and the accuracy of time synchronization can be increased by dividing the master 2 into the two systems, that is, the system of the main processor 10 and the system of the time synchronization processor 11, and dedicating the latter to time synchronization.

In the master 2, the separate CPUs are used in the main processor 10 and the time synchronization processor 11. The CPU of the main processor 10 is required to have a high computing ability because it needs to perform computation such as calculation using measurement data. There are few CPU options which have a high computing ability and can perform time synchronization processing.

In the embodiment, since the CPUs having the different functions are used in the main processor 10 and the time synchronization processor 11, respectively, the CPU used in the main processor 10 can be a one that specializes in a high computing ability, whereby a wide range of CPU options are available. Since the CPU used in the time synchronization processor 11 can be a one that specializes in time synchronization, it is not required to have a high processing ability. A wide range of CPU options are also available for the CPU used in the time synchronization processor 11.

Where the main processor 10 and the time synchronization processor 11 were implemented using a single CPU, the CPU should have a high processing ability and be capable of performing time synchronization processing. Only a narrow range of options would be available for such a CPU, and such a CPU would be expensive. In the embodiment, since the separate CPUs are used in the main processor 10 and the time synchronization processor 11, it is not necessary to use an expensive CPU, which enables cost reduction.

If the time synchronization processor 11 can be removed from the master 2, the synchronization processor 11 removed from the master 2 can be incorporated into another master. Such installation of the time synchronization processor 11 makes it possible to apply the concept of the embodiment to another type of system.

Although in the embodiment the slaves 3 are connected to the master 2 via the single relay 4, there may be a case that the slaves 3 are connected to the master 2 via plural relay 4. In such a case, the plural relay 4 are connected by two systems and one of the two systems is dedicated to time synchronization packets.

Although in the embodiment the master 2 and the relay 4 are separate apparatus, they may be implemented as integral hardware.

Although the time synchronization system 1 according to the embodiment is configured in such a manner that each slave 3 wirelessly communicates with one (or plural) field device 5, a time synchronization system may be configured in such a manner that each field device 5 wirelessly communicates with plural slaves 3. Depending on the positional relationships between the slaves 3 and the field devices 5, a field device 5 may exist which can communicate with plural slaves 3 wirelessly.

Depending on the installation environment of a field device 5, the radio wave transmission state (communication quality state) such as the radio wave intensity may vary. When the state of radio wave transmission between a field device 5 and a slave 3 with which the field device 5 has communicated so far has degraded, the wireless communication path may be switched dynamically using a slave 3 that provides a good radio wave transmission state. When dynamic switching is made between plural slaves 3, it is necessary that the slaves 3 are synchronized with each other. This measure makes it possible to realize good wireless communications between the slaves 3 and the field devices 5.

Although in the embodiment each slave 3 wirelessly communicates with one (or plural) field device 5, slaves 3 themselves may function as field devices 5, that is, physical quantity measurement and control devices. That is, each slave 3 may measure a physical quantity value and communicate measurement data to the master 2. In this case, the master 2 can control measurement by each slave 3 by sending control data to it.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A time synchronization system, comprising:
   a master comprising:
      a main processor to which a first IP address is assigned; and
      a time synchronization processor to which a second IP address is assigned, wherein the first IP address is different from the second IP address;
   a plurality of slaves configured to send a first packet whose destination is the first IP address and a second packet whose destination is the second IP address to the master, wherein the second packet is a packet for time synchronization between the master and one of the slaves, and the first packet is a data packet different from the second packet; and
   a relay provided between the slaves and the master to relay the first packet and the second packet sent from the slaves to the master, the relay being configured to send the first packet to the main processor and to send the second packet to the time synchronization processor, and wherein
   the main processor is configured to receive the first packet from the relay and perform a certain process on the first packet; and
   the time synchronization processor is configured to receive the second packet from the relay and perform a time synchronization process between the master and said one of the slaves based on the second packet.

2. The system of claim 1, further comprising:
   a plurality of field devices each configured to measure or control a physical quantity of an object and communicating with the slaves to send a measurement data or control data of the physical quantity of the object to the slaves, wherein the first packet is the measurement data or control data of the physical quantity of the object.

3. The system of claim 2, wherein the field devices are configured to communicate with the slaves through a wireless communication.

4. The system of claim 3, wherein the field devices are configured to communicate with the slaves through the wireless communication using a time division multiplex communication.

5. The system of claim 3,
   wherein the field devices are configured to dynamically select a slave having a high communication quality from the plurality of slaves and communicate with the selected slave.

6. The system of claim 3,
   wherein each of the slaves has an internal clock,
   after the internal clocks of the slaves are synchronized with each other, the field devices communicate with the slaves through the wireless communication using a time division multiplex communication.

7. The system of claim 1, wherein
   the plurality of slaves are configured to measure or control a physical quantity of an object, wherein the first packet is a measurement data or control data of the physical quantity of the object.

8. The system of claim 7, wherein the time synchronization processor is removable from the master.

* * * * *